March 31, 1925.
H. B. BUSH
TREE TRIMMER
Filed Sept. 20, 1919
1,531,688
2 Sheets-Sheet 1
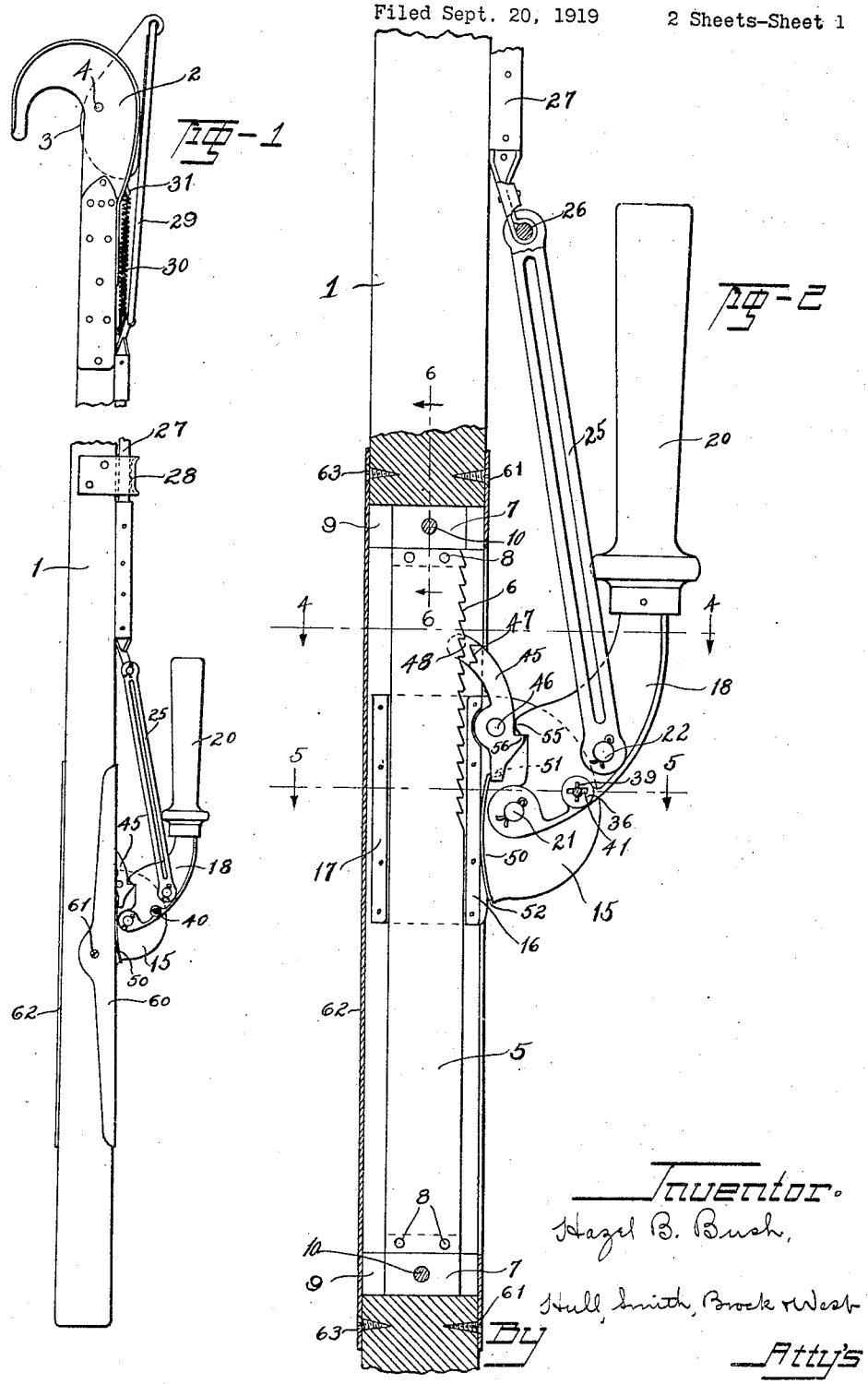

March 31, 1925.
H. B. BUSH
TREE TRIMMER
Filed Sept. 20, 1919
1,531,688
2 Sheets-Sheet 2
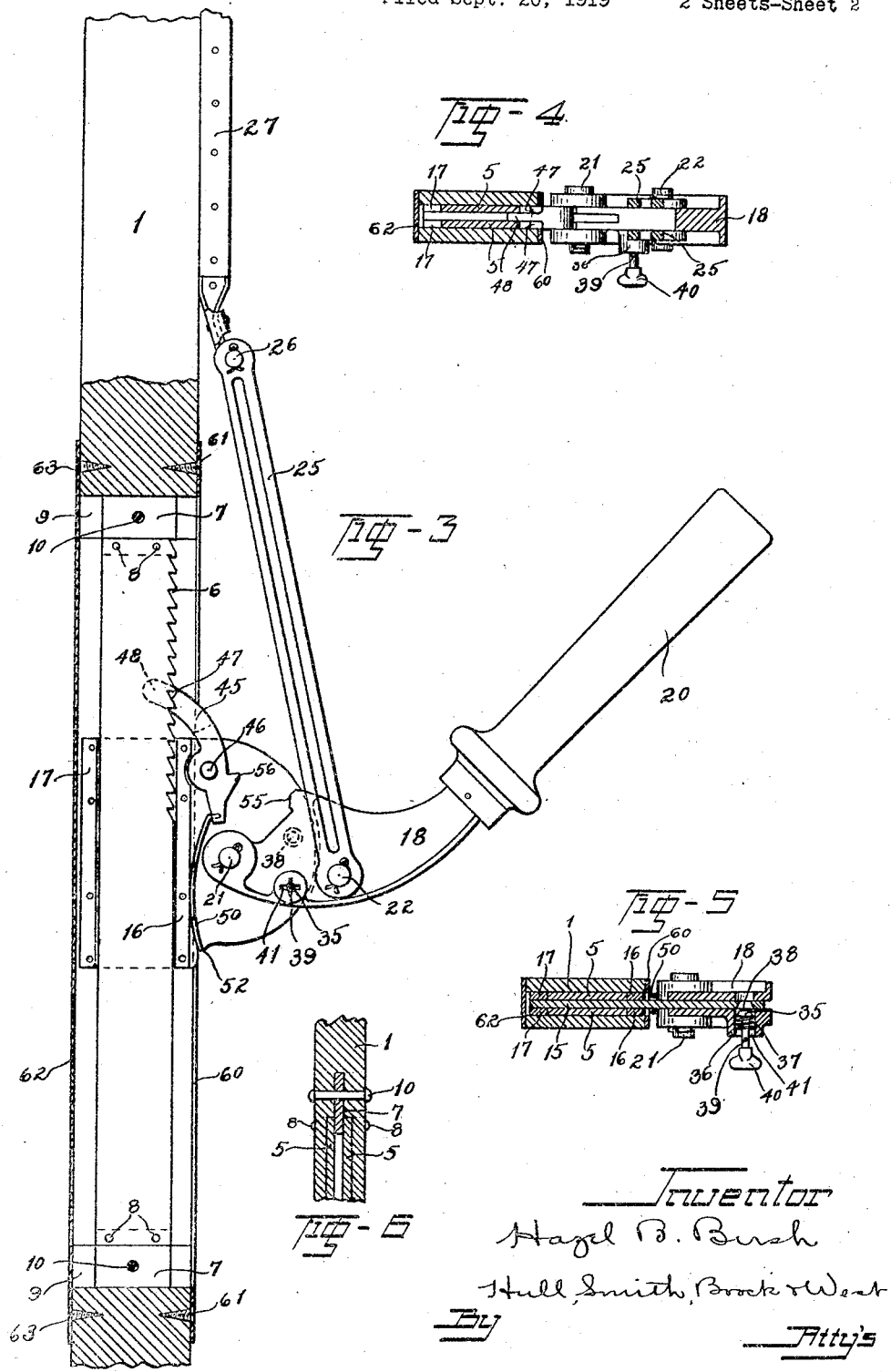

Patented Mar. 31, 1925.

1,531,688

UNITED STATES PATENT OFFICE.

HAZEL B. BUSH, OF BEDFORD, OHIO, ASSIGNOR TO THE BUSH ELECTRIC COMPANY, OF CLEVELAND, OHIO, A CORPORATION OF OHIO.

TREE TRIMMER.

Application filed September 20, 1919. Serial No. 325,103.

*To all whom it may concern:*

Be it known that I, HAZEL B. BUSH, a citizen of the United States, residing at Bedford, in the county of Cuyahoga and State of Ohio, have invented a certain new and useful Improvement in Tree Trimmers, of which the following is a full, clear, and exact description, reference being had to the accompanying drawings.

This invention relates to an improved tree pruning or trimming implement and more particularly to a safety appliance of this nature that is peculiarly adapted to electrical lineman's use in cutting away tree branches that are in proximity to electrical wires or conductors.

In work of the character recited above it is sometimes necessary to cut limbs or branches of considerable thickness, and it is the purpose of this invention to provide a tree trimming or pruning implement by means of which small twigs may be quickly and easily cut, while branches of greater diameter may be severed with equal facility but at a very slight sacrifice of speed for a material increase in power.

Further objects of the invention are to provide an implement of the character mentioned wherein the cutting means and manually operated actuating mechanisms are effectually insulated from each other so as to protect the operator against shocks; to provide an implement of the aforesaid character that is comparatively simple of construction, positive of operation, durable, reliable and convenient of handling.

An embodiment of the invention is illustrated in the accompanying drawings, and while I shall proceed to describe the present construction in detail, I wish to be understood as not limiting myself to such structural details further than is required by the terms of the claims annexed hereto.

In the drawings, Fig. 1 is a side elevation of a tree trimmer or pruner embodying my invention; Fig. 2 is an enlarged detail of the actuating mechanism of the implement; Fig. 3 shows the parts of Fig. 2 in another position; while Figs. 4, 5 and 6 are sectional details on the respective section lines 4—4, 5—5 and 6—6 of Fig. 2.

Referring to the drawings by the use of reference characters, 1 is a staff or handle that is preferably made of an especially treated wood which renders it impervious to moisture and produces of it an effectual insulating medium. A hook 2, designed to engage about a branch, is attached to the upper end of the staff 1, and a cutting blade 3 is pivoted at 4 to the hook 2.

The opposite end portion of the staff 1 is mortised to receive a pair of rack plates 5, these plates being so termed because of the series of ratchet teeth 6 that are formed along what I shall refer to as the front edges of the plates and which extend from their upper ends downwardly to about their middle portions, and the plates are spaced apart at the ends by blocks 7 to which the plates are attached by rivets or other securing means 8, the blocks occupying kerfs 9 at the top and bottom of the mortised cavity. The blocks 7 are shown as held in place by fastening means 10 which extend through the blocks and the adjacent side portions of the staff.

15 is a slide having a portion guided between the rack plate 5 and carrying, to the front and rear of the plates, rails 16 and 17 for maintaining the slide in proper relation to the plates. 18 is a lever, provided with a hand grip 20, and having its inner end forked to straddle the forwardly extending portion of the slide 15. The lever is pivoted to the slide by means of a pin 21. At a point comparatively near its fulcrum the lever has pivotally connected to it, through a pin 22, a pair of links 25 which have connection at 26 with a draw bar 27 that extends up alongside the staff and is slidably connected thereto by means of a suitable clip 28 that is carried by the staff. The upper end of the draw bar is connected, through a link 29, with the end of the blade 3 opposite its cutting portion. The draw bar is normally retained in elevated position by a spring 30 which has one of its ends attached to the draw bar and its opposite end anchored to a lug 31 of the hook 2.

A plunger 35, operating within a hollow boss 36 of the lever 18, is adapted to be projected by a spring 37 into an aperture 38 of the slide when the plunger is in register with said aperture, thereby to lock the lever against angular movement with respect to the slide. The parts are arranged to be held in unlocked position by withdrawing the plunger until a pin 39 that is carried thereby is removed beyond the outer end of the boss 36 when the plunger may be turned through the instrumentality of the head 40 to place the pin out of register with the transverse slot 41 in the end of the boss 36 so that the pin engages the outer end of the boss and holds the plunger retracted.

A detent or pawl 45 has its lower end bifurcated for engagement over the upper end of the slide 15, and it is pivoted to the slide by means of a pin 46. The free or upper end of the pawl or detent has two sets of teeth 47 for cooperation with the teeth 6 of the rack plates 5, and a tongue extension 48 of the pawl or detent engages between the plates and serves as a guide to assist in maintaining the pawl in proper relation to the plates. A spring 50 in the nature of a yoke, has its ends engaged within apertures in the lower ends of the branches of the detent, as indicated at 51, and the opposed branches of the spring bear against the adjacent rails 16, while the central portion of the spring is engaged within a notch 52 of the slide 15. The spring tends to oscillate the detent in a direction to engage its teeth 47 with the teeth 6 of the rack plates 5. When the lever 18 is in the position shown in Figs. 1 and 2 the detent 45 is held in inactive position (or with its teeth out of mesh with those of the rack plates 5) by reason of the engagement of projections 55 of the lever with the lugs 56 of the detent. It will be observed that when the parts are in the position stated, the projections 55 of the lever abut the detent in the zone of its pivot pin 46 so that a positive stop is provided for the lever which is capable of withstanding considerable strain. When the lever 18 is oscillated (under which circumstances it must be unlocked from the slide 15 by the retraction of the plunger 35) the projections 55 are removed from lugs 56 so that the spring 50 may oscillate the pawl or detent and project its teeth into engagement with those of the rack plates. The parts are shown in this position in Fig. 3. As the lever approaches normal position on its return movement, the inclined forward end of projections 55 engage over the ends of lugs 56 and cam them downwardly so as to project the lugs beneath the abrupt shoulders of the projections 55 an instant before the projections engage the detent to stop the swing of the lever.

An escutcheon plate 60 is fitted about the front edge of the staff 1 in the vicinity of the cavity containing plates 5, and its front wall is slotted to accommodate the slide and detent. The plate is held in place by screws 61. A finishing plate 62, secured to the rear side of the staff by screws 63, closes the cavity on this side.

In the operation of the implement the user engages the hook 2 over a twig or branch, and if the twig is of small diameter he may cut it with little effort by pulling straight downward on the handle 20, moving slide 15 much in the manner of operating a pump gun. This operation is repeated in all cases where the twigs are of a sufficiently small diameter to permit of their being cut with the power afforded by such a direct pull. However, when the branch to be cut is so large and tough as to make it inconvenient or impractical if not impossible for the operator to cut it by merely sliding the parts downward as in the foregoing example, he unlocks the lever from the slide by withdrawing the plunger 35 and initiates the operation exactly as before by sliding the handle downward until the cutting blade is inserted into the branch as far as it will conveniently go. Then with what is practically a continuation of the same movement the user swings the lever outwardly, whereupon the projections 55 withdraw from the lugs 56 and release the pawl or detent, permitting the spring 50 to throw the detent into mesh with the rack plates 5, thus locking the slide against upward movement and transmitting the swinging movement of the lever to the blade 3 through links 25 and 29 and draw bar 27 thereby forcing the blade with increased power further into the branch. It will be seen, by reference to Fig. 1, that the radius of the arc upon which the pivotal connection between links 25 and the lever travels is less than that described by the end of the blade 3 which has connection with link 29. Consequently, a complete throw of lever 18 will result in only a partial throw of the blade 3. After a throw of lever 18 has been effected, it may be returned to normal position, the slide 15 in the meantime dropping to a lower position where it is held against upward movement by the detent 45, so that the operation above described may be repeated and the blade 3 inserted still further into the branch. These operations are continued until the branch is completely severed.

Having thus described my invention, what I claim is:—

1. In combination with a tree trimming implement comprising a staff, and cutting mechanism carried by the staff, a lever slidably and swingably supported by the staff, operative connections between the lever and the cutting mechanism, means whereby the lever may be locked against swinging with respect to the staff, and means for holding the lever against sliding with respect to the staff when the lever is swung.

2. In combination with a tree trimming implement comprising a staff, and cutting mechanism carried by the staff, a slide reciprocable along the staff, a lever pivoted to the slide, operative connections between the lever and the cutting mechanism, and a detent for locking the slide against movement in a given direction, the lever and detent having parts cooperating to render the detent ineffective as a locking means when the lever is in a given position.

3. In combination with a tree trimming implement comprising a staff, and cutting mechanism carried by the staff, a slide reciprocable along the staff, a lever pivoted to the slide, operative connections between the lever and cutting mechanism, a detent pivoted to the slide, the detent being arranged to engage parts stationary with respect to the staff for holding the slide against movement in a given direction, means tending to swing the detent in a direction to engage said parts, the lever and detent having parts cooperating to hold the detent out of engagement with such parts when the lever is in a given position.

4. In combination with a tree trimming implement comprising a staff, and cutting mechanism carried by the staff, a lever slidably and swingably supported by the staff, operative connections between the lever and the cutting mechanism whereby said mechanism may be actuated by either a swinging or sliding movement of the lever, and means operating automatically to hold the lever against sliding movement when the swinging movement thereof is employed to actuate the cutting mechanism.

5. In combination with a tree trimming implement comprising a staff, and cutting mechanism carried by the staff, a slide reciprocable along the staff, a lever pivoted to the slide, means for locking the lever in a given position with respect to the slide, operative connections between the lever and the cutting mechanism, a detent movably carried by the slide and having parts for cooperation with parts stationary with respect to the staff, the lever and detent having portions cooperating to disengage the detent from said parts when the lever is in the aforesaid given position.

6. In combination with a tree trimming implement comprising a staff, and cutting mechanism carried by the staff, a lever swingably and slidably supported by the staff, a draw bar slidably connected to the staff and having operative connection with the cutting mechanism, and a link connecting the draw bar to the lever.

7. In combination with a tree trimming implement comprising a staff, and cutting mechanism carried by the staff, said staff having a mortised cavity, a pair of rack plates arranged side by side and spaced apart within the cavity and having each a series of teeth, a slide reciprocable between the plates and having an extension projecting beyond one side of the staff, a lever pivoted to the extension of the slide, operative connections between the lever and the cutting mechanism, a detent pivoted to the slide extension and having a part for cooperation with the teeth of the rack plates, the lever and detent having portions cooperating to disengage the detent from the teeth of the rack plates when the lever is in a given position.

8. In combination with a tree trimming implement comprising a staff, and cutting mechanism carried by the staff, said staff having a mortised cavity, a pair of rack plates arranged side by side and spaced apart within the cavity and having each a series of teeth, a slide reciprocable between the plates and having an extension projecting beyond one side of the staff, a lever pivoted to the extension of the slide, operative connections between the lever and the cutting mechanism, a detent pivoted to the slide extension and having a part for cooperation with the teeth of the rack plates, the lever and detent having portions cooperating to disengage the detent from the teeth of the rack plates when the lever is in a given position, the detent constituting a stop to limit the swinging movement of the lever in one direction.

9. In combination with a tree trimming implement comprising a staff, and cutting mechanism carried by the staff, said staff having a mortised cavity, rack plates arranged side by side and spaced apart within said cavity, a slide reciprocable between the plates and having guide elements cooperating with the plates, the slide having an extension projecting outside the cavity, a lever having a forked end that straddles the extension of the slide, means pivotally connecting the lever to the slide extension, a detent having parts for cooperation with the teeth of the rack plates and bifurcated for engagement over the extension of the slide, means pivotally connecting the detent to the slide extension, a spring carried by the slide and tending to swing the detent in a direction to engage its aforesaid parts with the teeth of the rack plates, the lever and detent having parts cooperating to maintain the detent in a position free from the teeth and of such shape as to swing the detent to said position when the lever is swung to a given position, and operative connection between the lever and the cutting mechanism.

10. In combination with a tree trimming implement comprising a staff, and cutting mechanism carried by the staff, said staff having a mortised cavity, rack plates arranged side by side and spaced apart within said cavity, a slide reciprocable between the plates and having guide elements cooperating with the plates, the slide having an extension projecting outside the cavity, a lever pivoted to the slide extension, a detent having parts for cooperation with the teeth of the rack plates and pivoted to the extension of the slide, a spring carried by the slide and tending to swing the detent in a direction to engage its aforesaid parts with the teeth of the rack plates, the lever and detent having parts cooperating to maintain the detent in a position free from the teeth when the lever is swung in a given position, operative connections between the lever and the cutting mechanism, and means closing the cavity of the staff and having a slot through which the slide extension and the detent operate.

In testimony whereof, I hereunto affix my signature.

HAZEL B. BUSH.